United States Patent
Estes et al.

(10) Patent No.: US 8,456,622 B1
(45) Date of Patent: Jun. 4, 2013

(54) SPATIAL AND TEMPORAL COHERENCE MEASUREMENT SYSTEM

(75) Inventors: Lee E. Estes, Mattapoisett, MA (US); Lynn T. Antonelli, Cranston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 415 days.

(21) Appl. No.: 12/892,317

(22) Filed: Sep. 28, 2010

(51) Int. Cl.
*G01N 21/00* (2006.01)
*G01B 9/02* (2006.01)

(52) U.S. Cl.
USPC ........................................ 356/73.1; 356/477

(58) Field of Classification Search
USPC ............ 356/477, 479, 73.1, 35.5, 32; 385/12, 385/115, 116; 250/227.11, 227.27, 227.28
See application file for complete search history.

(56) References Cited

U.S. PATENT DOCUMENTS

| | | | | |
|---|---|---|---|---|
| 5,956,447 | A * | 9/1999 | Zel'Dovich et al. | 385/116 |
| 6,137,565 | A * | 10/2000 | Ecke et al. | 356/35.5 |
| 6,246,822 | B1 * | 6/2001 | Kim et al. | 385/116 |
| 6,249,381 | B1 * | 6/2001 | Suganuma | 359/618 |
| 7,486,861 | B2 * | 2/2009 | Furman | 385/115 |
| 2008/0079949 | A1 * | 4/2008 | Kuroiwa | 356/496 |

* cited by examiner

*Primary Examiner* — Gregory J Toatley
*Assistant Examiner* — Dominic J Bologna
(74) *Attorney, Agent, or Firm* — James M. Kasischke; Michael P. Stanley; Jean-Paul A. Nasser

(57) ABSTRACT

A system for determining spatial coherence, temporal coherence or both of an optical signal includes a fiber bundle containing optical fibers. Optical fiber inputs are arranged in proximate groups having the same number of fibers. The groups can each receive a portion of the optical signal. Each fiber in the group has a gross length that differs from the other fibers, but each group has the same set of different gross lengths. The fibers are joined to a lens which spreads the optical signal and causes interference between portions of the signal. This interference is detected at a detector. A computer joined to the detector can measure spatial and temporal coherence from the interference. Other embodiments feature multiple detectors and reflection along the bundle.

16 Claims, 2 Drawing Sheets

SPATIAL AND TEMPORAL COHERENCE MEASUREMENT SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1. Field of Invention

This is a test apparatus and method for a laser that helps determine spatial coherence, temporal coherence, and modeling of noisy environments.

2. Description of the Prior Art

Most applications of lasers rely on the laser light beam having good spatial and temporal coherence. Spatial coherence means that the laser beam relative amplitude and phase at different lateral (to the beam propagation direction) positions stays constant over time. Temporal coherence means that the beam amplitude and phase at a lateral position doesn't vary with time. The optical field generated by a coherent beam has a simple structure such as a plane or spherical wavefront and a deterministic amplitude and phase profile with minimal time variation. Temporal coherence is measured in an interferometer, which interferes a light beam with a copy of itself delayed in time. Measurement of the time averaged intensity of the interfered light beam gives the temporal coherence. Spatial coherence is measured by interfering two portions of a light beam at different lateral positions. This can be measured by cross correlation of portions of the light beam separated by a distance. There is a need for a simple tool that can diagnose temporal and spatial incoherence of a laser's output.

Lasers operating outside laboratories are often in environments that cause scattering of the originally coherent beam. This can include varying environmental gas and liquid densities resulting from varying environmental temperatures and pressures. Systems that work in controlled conditions may not work when subjected to actual working conditions. Thus, there is a need for laboratory tool that can simulate arbitrary backscatter of an optical signal, and thus simulate laser operation under field conditions. Such a system would aid in the design of practical laser systems, and would thus be most welcome also.

SUMMARY OF THE INVENTION

A first object of the invention is to permit detection of changes in the temporal coherence of an optical signal.

Another object is to permit detection of changes in the spatial coherence of an optical signal.

Another object is to permit simulation of the behavior of an optical signal in a scattering medium.

In accordance with these and other objects made apparent hereinafter, the invention concerns a system for determining spatial coherence, temporal coherence or both of an optical signal. The system includes a fiber bundle containing a number of optical fibers. Input ends of the optical fibers are arranged in proximate groups having the same number of optical fibers. The proximate groups are each capable of receiving a portion of the optical signal. Each optical fiber in the group has a gross length that differs from at least one other fiber in the group. Each proximate group has fibers having the same set of gross different lengths. An output of the fiber bundle is joined to a lens which spreads the received optical signal and causes interference between portions of the signal. The lens can be eliminated if the far field diffraction pattern is observed. A detector is provided for detecting this interference. A computer can be joined to the detector for measuring spatial and temporal coherence from the detected interference. Other embodiments feature one or more detectors and reflection at the end of the fiber optic bundle.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
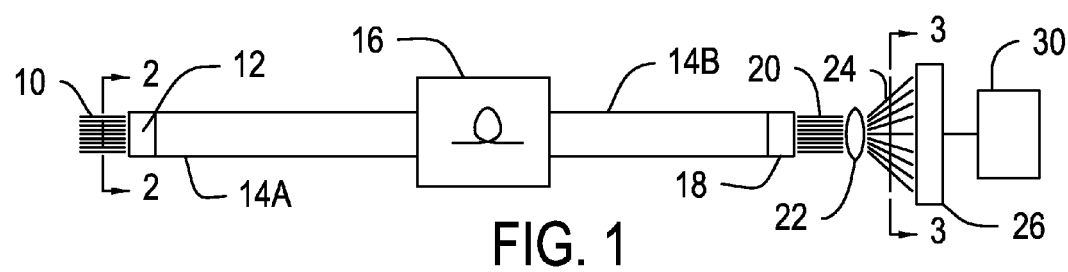
FIG. 1 is a schematic drawing illustrating an embodiment of the invention.

With reference to the drawing figures, wherein like numbers indicate like parts throughout the several views, FIG. 1 shows an optical system in which a first fiber optic bundle 14A contains a number of optical fibers. First bundle 14A has a connector 12 which receives a laser's output 10 so as to launch the output into the bundle 14A. The diameter of bundle 14A is preferably approximately the same size as the diameter of laser beam 10 so that spatial variations in light across the face of fiber bundle 14A will be fully replicated in the signals launched into the optical fibers of bundle 14A. First bundle 14A is joined to a fiber optic delay 16 which subjects the fibers of the first bundle to differing time delays as will be discussed further in the ensuing text. In one embodiment, delay 16 output is joined to a second fiber optic bundle 14B for transporting the variably delayed light to additional components. In other embodiments, delay 16 could be joined directly to the additional components.

Figure 3:
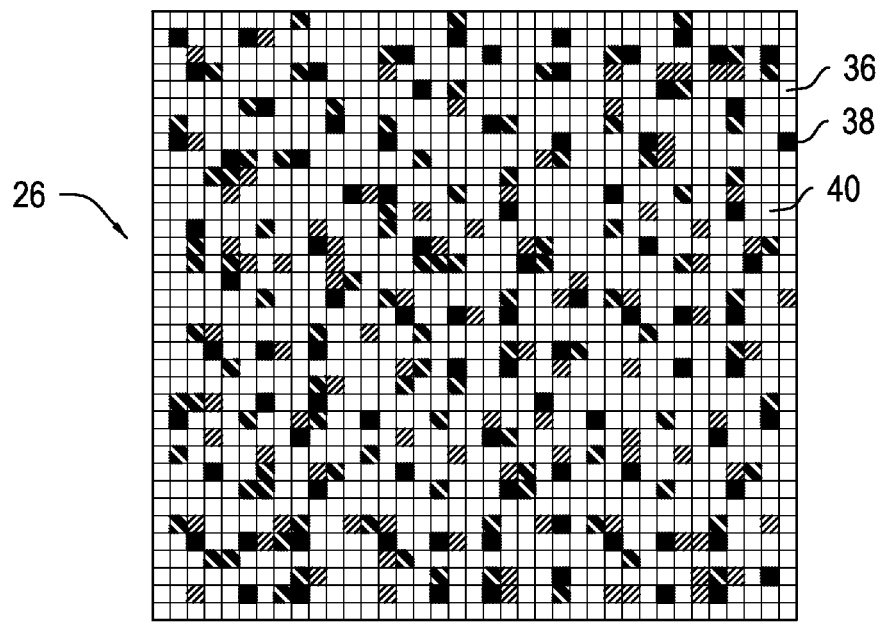
FIG. 3 is a view in the direction of lines 3-3 of FIG. 1 in the back focal plane of lens 24 at detector 26.

In any case, delay 16 output is provided at a connector 18 where optical signals 20 are provided to a lens 22. Lens 22 combines optical signals 20 as an interference beam 24 projected onto detector 26. The active surface of detector 26 is located at the back focal plane of lens 22 so as to cause the outputs of the individual optical fibers to interfere on the active surface of detector 26, forming an interference pattern thereon. FIG. 3 provides a sample of the interference pattern. Detector 26 detects this pattern in pixel form and transmits it to a processor 30. Processor 30 is preferably a computer capable of recording the pixel data, processing the pixel data or both.

Figure 2:
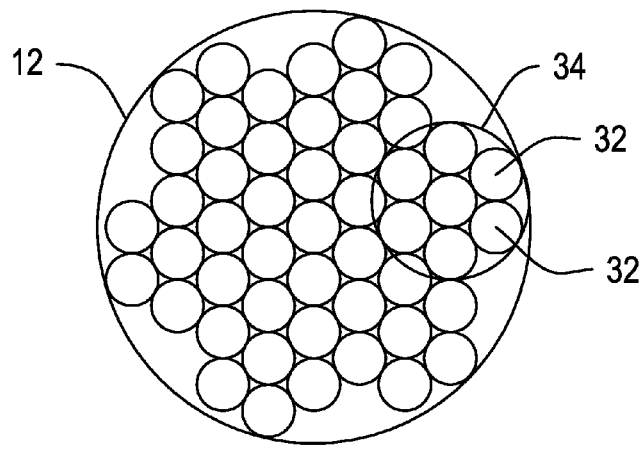
FIG. 2 is a view in the direction of lines 2-2 of FIG. 1.

FIG. 2 provides a view of connector 12 as indicated by the 2-2 view lines of FIG. 1. Connector 12 has a plurality of fiber optic inputs 32 organized as groups 34 of nearby inputs. In one embodiment these can be arranged in a hexagonal formation such as that shown in FIG. 2; however, other arrangements can be used. In the embodiment shown, one input 32 is surrounded by six inputs 32 to form geometric group 34. In the embodiment of FIG. 2, this provides forty-nine optical fibers, disposed in seven groups of seven fibers. Each input 32 is joined to a separate fiber in bundle 14A. Downstream of connector 12 in bundle 14A, a conventional bundling sheath encloses the optical fibers. As discussed above, connector 12 has dimensions capable of receiving substantially the entirety of laser output 10.

The value of having multiple optical fibers grouped in multiple groups, and having the fibers in each sub-group collected at input 12, is that the laser's output is spatially sampled in space over the same gross path delays. Ensemble averaging of the interference pattern correlations can then be achieved by using temperature changes induced by subjecting fiber optic delay 16 to heating or by otherwise applying random stresses to the fibers. This can be done by passing a heat gun such as a hair dryer over delay 16 in a random fashion. Generally, more fibers in each group allows sampling larger path length differences. This makes the interference pattern more sensitive to variations in frequency and phase fluctuations. The more groups, the more resolution the system has for spatial distortions. The seven times seven configuration of FIG. 2 has the dual advantages of providing a significant number of groups and fibers, in a geometrical configuration that is compact and thus readily packable as a fiber bundle. In principle, one can operate the system with as little as two fibers, which would have poor temporal and spatial resolution, or thousands, which would be unwieldy. One can advantageously pack the open spaces in bundles 14A and 14B with epoxy, or dead optical fibers (ones that carry no signal), provided that the packing fibers do not optically couple to any of the forty-nine active fibers.

Fiber optic delay 16 is joined to each fiber in bundle 14A and comprises a plurality of optical fibers coiled in loops for compact packaging. These loops can be loose or wound on a mandrel. Many different constructions exist for this device. Each fiber of a geometric group 34 is provided to a loop having a length differing from at least one other fiber in the group; however, all the groups are subjected to the same set of delays. For example, one fiber could be subjected to a one loop delay, another to a two loop delay, a third to a three loop delay and so on. For most applications, each fiber of a geometric group 34 should be subjected to a different gross delay. Light in each of the optical fibers of bundle 14A should have the phases upstream that are determined by the optical path lengths of the fibers. While the gross delays of the fibers are determined by the design fiber length, the phase shifts on the scale of 0-360 degrees depend on fine differences of the fiber lengths and index of refraction changes caused by fiber stresses and fiber temperature variations.

Detector 26 can advantageously be a two dimensional planar array of photomultipliers, or high-speed photodiodes, which are fast devices that permit rapid data handling. The interference pattern on detector 26 will be defined by the phase differences imposed by fiber optic delay 16 on the optical fibers in bundle 14A. The interference pattern depends on the spatial, frequency, and phase characteristics of the optical signal entering the fiber bundle 14A at connector 12. FIG. 3 provides an interference pattern on pixels 36 of detector 26 as an example. Darker regions such as 38 in FIG. 3 indicate a greater reception of light. An actual detector 26 interference pattern may feature many more pixels 36. The interference pattern is a common speckle pattern in which the speckled patches result from constructive (more filled areas such as 38) and destructive (less filled areas such as 40) interference of output from optical fibers. The size of individual pixels 36 should be significantly smaller than speckle size to adequately sample the spatial variations of the interference pattern illuminating detector 26.

By comparing the interference pattern at 26 at different times, one can determine if the pattern is changing with time or not, and thus whether the temporal or spatial characteristics of the laser output has changed over time. One can infer such change in any known manner that compares interference patterns detected at different times. An especially advantageous way to do so is as follows:

When a laser beam 10 provides pulses to input 12 at different times, detector 26 detects the interference patterns produced by the laser. The computer 30 can perform a spatial correlation between the interference patterns generated by the two pulses. The normalized magnitude squared of the cross-correlation between the two images will be unity if the amplitude and spatial phase of the field across the face of the fiber bundle does not vary from pulse to pulse. This result can be further averaged over many pulse pairs. This cross-correlation reduces from maximum to the extent that the pulses are temporally incoherent over the lateral extent of the light that illuminates the fiber bundle. Lower scores for spatial correlation indicate that the beam 10 lacks spatial coherence.

The correlation between the two speckle patterns will be reduced from unity in proportion to the product of the normalized magnitude squared of the spatial correlation of the two pulse complex field amplitudes and the cross correlation between the two time energy spectra evaluated at the frequency difference between the two pulses. The effects of spatial variation can be removed in several ways. One can remove the effects of spatial variation by increasing the size of the input beam 10 so that the fiber bundle 16A samples only a small portion of the input beam 10. With the effects of spatial variation removed, changes in the interference pattern are due solely to temporal changes at the region of beam 10 sampled by the fiber bundle input 12. This permits computer 30 to identify temporal coherence issues.

The optical fibers should be well-cleaved at both the input end 12 and output end 18 to have a very regular flat surface so that laser light 10 launches into the individual fibers efficiently, and without variations in amplitude introduced by poorly trimmed fiber terminations. The terminations of fibers at both input and output should be highly polished to prevent optical scattering. As mentioned above, the orientation of the fibers at input connector 12 and output connector 18 must remain fixed during operation. Otherwise, the diffraction pattern on detector 26 will vary for reasons unconnected with laser performance. Because the system operates by comparing sequential outputs detected over time, it is not critical that the location of fibers in the various sub-groups be the same, save that fibers of the same length in adjacent sub-groups should not be adjacent to one another so as to better sample the space-time structure of the light beam. And, as above, all fibers of each group should be together and adjacent one another at input 12 to permit good spatial resolution.

In addition to monitoring laser performance, the system of FIG. 1 can simulate operation of a laser in a scattering medium. In such a medium, laser light encounters various localized scatters along its trajectory, causing multiple reflections that arrive back at the origin spaced apart in time in accordance with the respective distances of scatterers. The multiple delay lines of this system can simulate returns from a corresponding number of scatterers. The speckle pattern on detector 26 is characteristic of the spatial distribution of light entering a system sensor. One can also simulate movement of the scatters by passing a heat gun over delay 16 with random position changes of the heat gun causing random changes in the phases of the fiber outputs, or by applying random stresses to the fibers emulating random movements of scatterers.

A seven-group, seven fiber per group, optical fiber bundle of the kind above described has been fabricated and successfully operated. The diameter and number of fiber loops is selected to give a delay that is combined with the total fiber length to give a total required delay. For ease of use, fiber number corresponds to the number of loops. Loops, lengths and delay times are shown in Table 1, below. This embodiment also uses a laser pulse duration of 10 ns, a fiber delay length increment of 0.4 m and a loop diameter of approximately 0.127 m.

TABLE 1

| Fiber No. | No. Fiber Loops | Looped Fiber Length (m) | Total Fiber Length (m) | Loop Propagation Time (ns) | Total Fiber Propagation Time (ns) |
| --- | --- | --- | --- | --- | --- |
| 1 | 1 | 0.4 | 1.4 | 2.0 | 7.0 |
| 2 | 2 | 0.8 | 1.8 | 4.0 | 9.0 |
| 3 | 3 | 1.2 | 2.2 | 6.0 | 11.0 |
| 4 | 4 | 1.6 | 2.6 | 8.0 | 13.0 |
| 5 | 5 | 2 | 3 | 10.0 | 15.0 |
| 6 | 6 | 2.4 | 3.4 | 12.0 | 17.0 |
| 7 | 7 | 2.8 | 3.8 | 14.0 | 19.0 |

The delay times in the fibers and input pulse duration were selected so that, there was some time overlap for the light exiting the different fibers. Only the tips of the fibers were actually tightly bundled together and provided with connectors. The optical fibers were of Nufern 460-HP mode fiber, which are single mode above 500 nm wavelength input. In testing, a green laser was used as the optical input.

Figure 4:
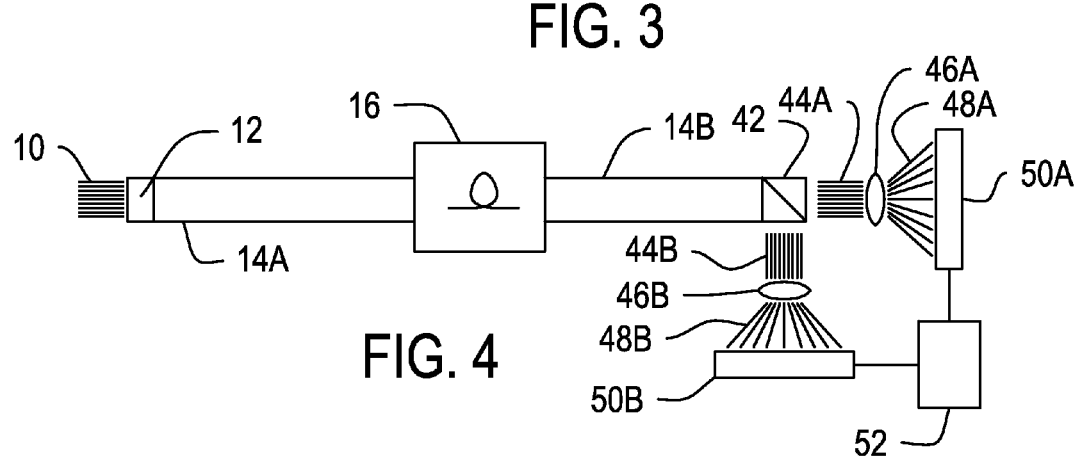
FIG. 4 is a schematic drawing illustrating another embodiment of the invention.

FIG. 4 shows a system similar to that of FIG. 1, but with two detectors 50A and 50B. In this embodiment, a splitter 42 is disposed in place of output 18. Splitter 42 splits the output into a first output beam 44A and a second output beam 44B. First and second output beams 44A and 44B are transmitted through lenses 46A and 46B respectively. Lens 46A spreads first output beam 44A into first interference beam 48A. Detector 50A is positioned at the back focal plane of lens 46A. Likewise, lens 46B spreads second output beam 44B into second interference beam 48B which detector 50B receives. Detectors 50A and 50B can be in the form of cameras. Laser light 10 can be provided as a sequence of pulse pairs. Detectors 50A and 50B are synchronously shuttered so that one of the pulses in each pair is detected by one detector 50A, the other pulse detected by the other detector 50B. This provides a pair of diffraction speckle patterns for comparison by which to detect incoherence between the two pulses, as above described. If one uses this setup to simulate a scattering medium, and heating of fibers or random stresses of the fibers are used to simulate movement of scatters, one must generate the two pulses in a pulse pair sufficiently close in time so that there would be no appreciable change in any fiber's index of refraction between the two pulses. An advantage of this arrangement is that one can use slower and hence less expensive, detectors.

Figure 5:
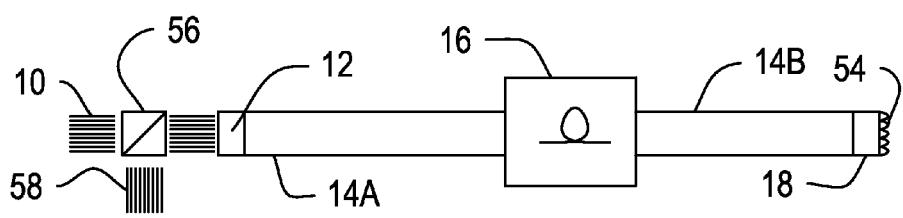
FIG. 5 is a schematic drawing of another embodiment of the invention that is well suited to simulate back scattering of light.

FIG. 5 shows an embodiment in which the terminations of the optical fibers have reflective coatings 54 at the fiber ends of output 18. The terminations of the optical fibers at system input 12 have anti-reflective coatings. Before entering input 12, laser light 10 is provided to an optical beamsplitter 56. Beamsplitter 56 allows transmission of light 10 to input 12 and into fiber bundle 14A. Light 10 traverses the length of bundle 14A through fiber optic delay 16 and second fiber bundle 14B to output 18. At output 18, light reflects from reflective coating 54 back along the same fiber. Reflected light travels through bundle 14B, delay 16, and bundle 14A. Light exits from input 12 and encounters beamsplitter 56. Beamsplitter 56 reflects all of the returning light along an output path 58. Light at output path 58 can be provided for detection and processing in the manner described above. The scheme of FIG. 5 doubles the optical path of the fibers, permitting simulation of scatters distributed along a length twice as long as the fiber length differences.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

What is claimed is:

1. A coherence measurement system for receiving input from a coherent light source, said system comprising:
   a plurality of optical fibers having first ends and second ends, the first ends being arranged in proximate groups having the same number of optical fibers with each of said proximate groups being capable of receiving a portion of the input, and with each optical fiber of said plurality of optical fibers having a gross length that differs from at least one of another said optical fiber within said proximate group, and wherein each proximate group has fibers having the same set of different lengths, with said second ends of said optical fibers being arranged in the same proximate groups as the first ends as an output;
   a lens having a front side positioned to receive light from said output of said plurality of optical fibers and a back side opposite said front side for providing focused light at a back focal plane; and
   a detector having an active surface positioned at the back focal plane of said lens and capable of detecting the interference of light from said lens at the back focal plane, said detected interference allowing measurement of coherence.

2. The system of claim 1 wherein the first ends of said plurality of optical fibers altogether are sized and arranged for receiving a substantial portion of the light from the light source.

3. The system of claim 1 wherein said detector has a detector output capable of providing a digitized representation of the interference.

4. The system of claim 3 further comprising a computer electronically joined to the detector output for receiving the digitized representation of the interference.

5. The system of claim 1 wherein the different lengths of said plurality of optical fibers are loops of fiber located together in a fiber optic delay module.

6. The system of claim 1 further comprising:
   a splitter positioned to receive light from the output of said plurality of optical fibers, said splitter being capable of splitting light from the output into a first splitter output and a second splitter output;

wherein said lens comprises a first lens having a first front side positioned to receive light from the first splitter output and a first back side opposite said first front side for providing focused light at a first back focal plane and a second lens having a second front side positioned to receive light from the second splitter output and a second back side opposite said second front side for providing focused light at a second back focal plane; and wherein said detector comprises a first detector having a first active surface positioned at the first back focal plane of said first lens and a second detector having a second active surface positioned at the second back focal plane of said second lens, said first and second detectors being capable of detecting interferences at slightly differing times of light at the first back focal plane and the second back focal plane.

7. The system of claim 6 wherein said first and second detectors have first and second detector outputs capable of providing a digitized representation of the respective first and second interferences.

8. The system of claim 7 further comprising a computer electronically joined to the first detector output for receiving the digitized representation of the interference at the first back focal plane and the second detector output for receiving the digitized representation of the interference at the second back focal plane.

9. A coherence measurement system for receiving input from a coherent light source, said system comprising:
a beamsplitter having a first input positioned to receive the input light, a port for providing light received at the first input, and an output for providing light received at the port;
a plurality of optical fibers having first ends and second ends, the first ends being arranged in proximate groups having the same number of optical fibers with each of said proximate groups being capable of receiving a portion of light from the port of said beamsplitter, and with each optical fiber of said plurality of optical fibers having a length that differs from at least one of another said optical fiber within said proximate group, and wherein each proximate group has fibers having the same set of different lengths, with said second ends of said optical fibers being arranged in the same proximate groups as the first ends as an output;
a reflector positioned at the output of said plurality of optical fibers, said reflector reflecting light back along the same optical fibers as that providing the light whereby light is transmitted back through said plurality of optical fibers such that the light exits the first ends of said plurality of optical fibers and is received by the port of said beamsplitter;
a lens having a front side positioned to receive light from the output of said beamsplitter and a back side opposite said front side for providing focused light at a back focal plane; and
a detector having an active surface positioned at the back focal plane of said lens and capable of detecting the interference of light from said lens at the back focal plane, said detected interference allowing a measurement of coherence.

10. The system of claim 9 wherein the first ends of said plurality of optical fibers altogether are sized and arranged for receiving a substantial portion of the light from the port of said beamsplitter.

11. The system of claim 9 wherein said detector has a detector output capable of providing a digitized representation of the interference.

12. The system of claim 11 further comprising a computer electronically joined to the detector output for receiving the digitized representation of the interference.

13. The system of claim 9 wherein the different lengths of said plurality of optical fibers are loops of fiber located together in a fiber optic delay module.

14. A method for testing a light source comprising the steps of:
providing a plurality of optical fibers having first ends and second ends, the first ends being arranged in proximate groups having the same number of optical fibers with each of said proximate groups being capable of receiving a portion of the input, and with each optical fiber of said plurality of optical fibers having a gross length that differs from at least one of another said optical fiber within said proximate group, and wherein each proximate group has fibers having the same set of different lengths, with said second ends of said optical fibers being arranged in the same proximate groups as the first ends as an output;
providing a first light pulse to said plurality of optical fibers first ends at a first time;
causing light from said first light pulse from said plurality of optical fibers output to interfere producing a first interference;
detecting said first interference as a first interference pattern;
digitizing said first interference pattern;
recording said first digitized interference pattern in response to said first light pulse;
providing a second light pulse to said plurality of optical fibers first ends at a second time varying from said first time;
causing light from said second light pulse from said plurality of optical fibers output to interfere producing a second interference;
detecting said second interference as a second interference pattern;
digitizing said second interference pattern;
recording said second digitized interference pattern in response to said second light pulse;
performing a spatial correlation between said first digitized interference pattern with said second digitized interference pattern to obtain a normalized magnitude squared of the cross-correlation; and
utilizing the normalized magnitude squared as a measure of temporal stability of the light source.

15. The method of claim 14 further comprising the step of removing the affect of spatial incoherence before said step of causing light to interfere in order to determine temporal coherence.

16. The method of claim 14 further comprising the steps of:
providing additional light pulses;
recording an additional digitized interference pattern in response to each additional light pulse; and
averaging said digitized interference patterns over many pulse pairs to obtain an average interference pattern.

* * * * *